(12) United States Patent
Hassman et al.

(10) Patent No.: US 8,465,564 B2
(45) Date of Patent: Jun. 18, 2013

(54) FILTER MEDIUM

(75) Inventors: Christian Hassman, Mittelneufnach (DE); Jörg Lehnert, Schwabmünchen (DE); Hans-Juergen Meitinger, Großaitingen (DE)

(73) Assignee: Johns Manville, Denver, CO (US)

( * ) Notice: Subject to any disclaimer, the term of this patent is extended or adjusted under 35 U.S.C. 154(b) by 409 days.

(21) Appl. No.: 12/782,241

(22) Filed: May 18, 2010

(65) Prior Publication Data

US 2010/0307338 A1  Dec. 9, 2010

(51) Int. Cl.
*B01D 46/00* (2006.01)

(52) U.S. Cl.
USPC ............... 55/487; 55/486; 55/DIG. 5; 95/287

(58) Field of Classification Search
USPC ............... 55/486, 487, DIG. 5; 95/287
See application file for complete search history.

(56) References Cited

U.S. PATENT DOCUMENTS

| | | | | |
|---|---|---|---|---|
| 4,318,774 | A * | 3/1982 | Powell et al. | 162/129 |
| 7,125,434 | B2 * | 10/2006 | Yavorsky et al. | 55/486 |
| 7,390,443 | B1 * | 6/2008 | Choi | 264/6 |
| 7,398,887 | B2 * | 7/2008 | Choi | 210/491 |
| 7,896,941 | B2 * | 3/2011 | Choi | 55/486 |
| 2002/0139744 | A1 * | 10/2002 | Choi | 210/491 |
| 2007/0227359 | A1 | 10/2007 | Choi | |

FOREIGN PATENT DOCUMENTS

| | | |
|---|---|---|
| EP | 1378283 A1 | 1/2004 |
| EP | 1604717 A1 | 12/2005 |
| EP | 1829603 A1 | 9/2007 |
| WO | 2004050216 A1 | 6/2004 |

* cited by examiner

*Primary Examiner* — Robert Clemente
(74) *Attorney, Agent, or Firm* — Robert D. Touslee

(57) ABSTRACT

The present invention relates to a method for the manufacture of a multilayered filter medium whose air permeability is at least 500 l/m²sec and a multilayered filter medium obtainable by said method which, when charged with 5 mg/cm² SAE-dust of the class "fine", exhibits a pressure increase of no more than 100 Pa.

17 Claims, 1 Drawing Sheet

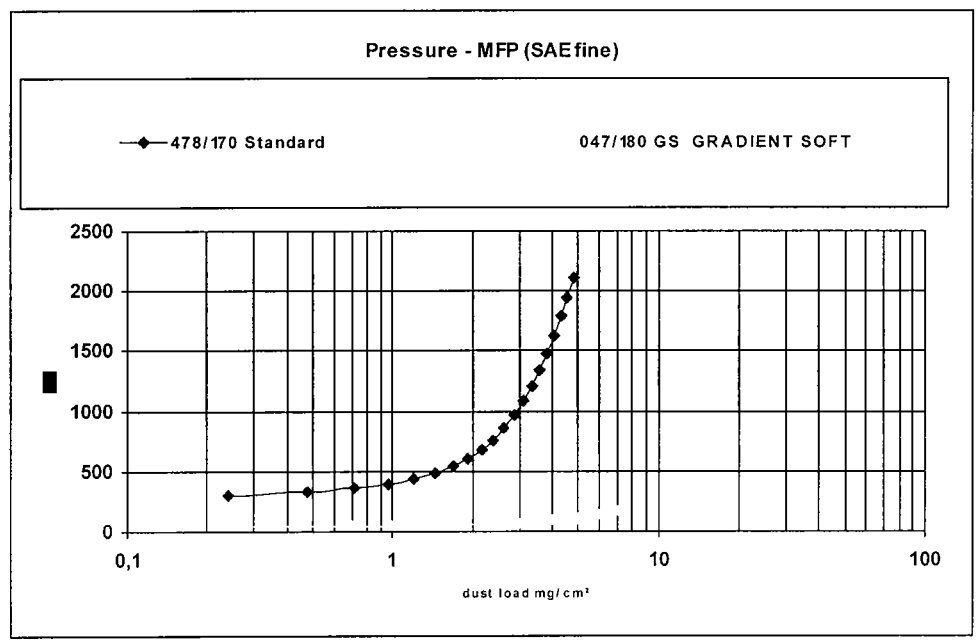

FILTER MEDIUM

BACKGROUND OF THE INVENTION

The present invention relates to a filter made of a multilayered filter medium, a method for the manufacture thereof and the use of the filter according to the invention.

The use of filters, particularly of multilayered filter media, has long been known in the art. For example air filters have long been used in the automotive sector, in air conditioning systems, indoor filters, pollen filters, clean-room filters, domestic filters etc. Filters have also long been used for the filtration of fluid media. Examples include oil filters and hydraulic filters.

Depending upon of the area of application the filters are adapted in order to achieve a sufficient filtration efficiency and service life. Thus LEFs (Low Efficiency Filters) are used as pre-filters in air/gas and fluid filtration, while High Efficiency Filters are also used in the area of HEPA (air) or water treatment.

U.S. Pat. No. 5,993,501 discloses multilayered filter media and filters consisting of a rigid pleatable base layer, the actual filter layer and a top layer.

EP-A-0980700 discloses filter media and filters with a gradient structure.

EP-A-0729375 discloses voluminous filter media and filters based on crimped fibres.

EP-A-0789612 discloses compressed filter media and filters based on melt polymers.

EP-A-1313538 discloses voluminous filter media and filters based on crimped fibres and additional microfibres.

EP-A-1378283 also discloses in a general manner multilayered filter media and filters.

The aforementioned known filters and filter media are already well-suited for gas and fluid filtration. There is nevertheless a need for further-improved filters which permit in particular a higher air flow rate and at the same time exhibit a high separation efficiency without an excessive pressure loss being observed.

BRIEF SUMMARY OF THE INVENTION

It has been found in a surprising manner that the known filter media can be significantly improved by the use of special multilayered filter media.

The subject-matter of the present invention is therefore a method for the manufacture of a multilayered filter medium whose air permeability is at least 500 l/m²sec comprising the measures:
a) Formation of a textile fabric comprising carrier and melt binder fibres wherein the carrier fibres consist of a polyester and the melt binder fibres consist of a polymer whose melting point is at least 5° C. below the melting point of the carrier fibres and the carrier and melt binder fibres have a titre in the region of 1 to 2 dtex,
b) Formation of a further textile fabric on the textile surface formed in step a) comprising carrier and melt binder fibres wherein the carrier fibres consist of a polyester and the melt binder fibres consist of a polymer whose melting point is at least 5° C. below the melting point of the carrier fibres and the carrier and melt binder fibres have a titre in the region of 2 to 4 dtex,
c) Formation of a further textile fabric on the textile surface formed in step b) comprising carrier and melt binder fibres wherein the carrier fibres consist of a polyester and the melt binder fibres consist of a polymer whose melting point is at least 5° C. below the melting point of the carrier fibres and the carrier and melt binder fibres have a titre in the region of 4 to 12 dtex,
d) The portion of the textile fabric formed in step a) is 20 to 60% by weight, the portion of the textile fabric formed in step b) is 10 to 40% by weight and the portion of the textile fabric formed in step c) is 10 to 40% by weight,
e) The portion of the melt binder fibres in the textile fabric formed in accordance with steps a) to c) is 5 to 40% by weight,
f) The weight per unit area of the textile fabric formed in accordance with steps a) to c) is 50 to 400 g/m²,
g) Pre-solidification of the multilayered textile fabric formed in accordance with steps a) to c) by means of a heated roller whose surface temperature is at least 70° C.,
h) Calendering of the pre-solidified multilayered textile fabric formed in accordance with step g) by means of a calender whose surface temperature is at least 10° C. below the melting temperature of the melt binder fibres and a contact pressure/line pressure of at least 20 daN,
i) Introduction of the multilayered textile fabric calendered in accordance with step h) into a hot-air oven whose minimum temperature is equal to or above the melting temperature of the melt binder fibres and whose maximum temperature is at least 10° C. below the melting temperature of the carrier fibres wherein the introduced textile fabric expands and the thickness of the textile fabric increases by at least 30% with respect to the introduced textile fabric,
j) Cooling of the melt binder-solidified multilayered filter medium and assembly.

A further subject-matter of the present invention is a method for the manufacture of a multilayered filter medium comprising the measures a) to j), wherein, as a further measure c'), at least one further textile fabric comprising carrier and melt binder fibres, preferably bicomponent fibres, particularly of the core-sheath type is formed on the textile surface formed in step c), wherein the carrier fibres consist of a polyester and the melt binder fibres consist of a polymer whose melting point is at least 5° C. below the melting point of the carrier fibres and the carrier and melt binder fibres have different titres in the region of 1 to 12 dtex, wherein the further textile fabric(s) has a weight per unit area of 50-400 g/m², preferably 50-200 g/m² and the portion of the melt binder fibres in the further textile fabric is 5 to 40% by weight.

The formation of the textile fabrics in step a) to c) and/or c') is carried out using known methods. The textile fabrics formed in accordance with the invention concern pleatable nonwoven fabrics, preferably staple fibre nonwoven fabrics and/or spunbonded nonwoven fabrics, particularly spunbonded nonwoven fabrics. Spunbonded nonwoven fabrics, i.e. so-called spunbonds, are produced by a random deposition of freshly melt-spun filaments. The filaments are endless synthetic fibres made of melt-spinnable polymer materials.

BRIEF DESCRIPTION OF THE DRAWINGS

The present invention is described in conjunction with the appended figures:

FIG. 1 illustrates testing of the filter medium of the invention in comparison with a conventionally manufactured filter medium.

DETAILED DESCRIPTION OF THE INVENTION

The textile fabrics formed in accordance with the invention, particularly the formed nonwoven fabrics, have no texturing, i.e. crimping.

The carrier fibres preferably comprise and/or consist of the spunbonded nonwoven fabrics made of melt-spinnable polyesters. In principle, all suitable known polyester material types may be considered with respect to fibre manufacture. Such polyesters predominantly consist of modules deriving from aromatic dicarboxylic acids and of aliphatic diols. Common aromatic dicarboxylic acid modules are the bivalent residues of benzene dicarboxylic acids, particularly of terephthalic acid and isophthalic acid; common diols have 2 to 4 C-atoms, wherein the ethylene glycol is particularly suitable. Particularly advantageous are spunbonded nonwoven fabrics, which consist up to at least 85 mol % of polyethylene terephthalate. The remaining 15 mol % then comprise dicarboxylic acid units and glycol units which act as so-called modification agents and which permit the specialist in the art to influence the physical and chemical properties of the manufactured filaments in a targeted manner. Examples of such dicarboxylic acid units are residues of isophthalic acid or of aliphatic dicarboxylic acid such as e.g. glutaric acid, adipic acid, sebacic acid; examples for diol residues with modifying action are those of long chained diols, e.g. of propane diol or butane diol, of di- or triethylene glycol or, if available in small quantities, of polyglycol with a molar weight of approx. 500 to 2000.

Particularly preferred are carrier fibres made of polyester, which contain at least 95 mol % polyethylene terephthalate (PET), particularly those made of unmodified PET.

The polyesters used in accordance with the invention preferably have a molecular weight corresponding to an intrinsic viscosity (IV), measured in a solution of 1 g polymer in 100 ml dichloroacetic acid at 25° C., of 0.6 to 1.4.

As hot-melt adhesive fibres particularly polymers and/or modified polyesters having a melting point which is 10 to 50° C., preferably 30 to 50° C., lower with respect to the carrier fibre raw material may be considered. Examples of a such holt-melt adhesives are polypropylene, polybutene terephthalate or condensation of long-chain diols and/or polyethylene terephthalate modified by isophthalic acid or aliphatic dicarboxylic acids.

Carrier and hot-melt adhesive fibres are preferably based on a polymer class. This means that all employed fibres from a substance class are selected such that these can be recycled without difficulty after use of the nonwoven fibre. Should the carrier fibres consist for example of polyester, the holt-melt adhesive fibres are also selected for example from polyesters or from a mixture of polyesters, e.g. as bicomponent fibres with PET in the core and a low temperature-melting polyethylene terephthalate copolymer as a sheath. Furthermore bicomponent fibres based on different polymers are, however, also possible.

Such melt binder-solidified spunbonded nonwoven fabrics are described in detail for example in EP-A-0,446,822 and EP-A-0,590,629.

The hot melt adhesives are introduced to the nonwoven fabric in fibre form. In this case it is beneficial to co-extrude the hot-melt fibres with the carrier fibres such that a homogenous distribution of the two fibre types is achieved.

The filaments or staple fibres on which the nonwoven fabrics are based may have a practically round cross section or may also have other shapes such as dumbbell, oval, triangular and/or trilobal or multilobal cross sections. Hollow fibres and bicomponent or multicomponent fibres can also be used. Furthermore, the hot-melt adhesive fibres can also be used in the form of bicomponent or multicomponent fibres.

In a further embodiment of the invention bicomponent or multicomponent fibres can also be used instead of the carrier and melt binder fibres. This preferably concerns so-called core-sheath bicomponent fibres, wherein these can also be formed eccentrically. This hereby also permits a particularly homogenous distribution of the two types.

If bicomponent fibres of the core-sheath type are used in place of the carrier and melt binder fibres the core is formed from the same material as the previously-cited carrier fibres and the sheath from the same material as the previously-cited melt binder fibres. The melting point of the sheath component is preferably at least 5° C. below the melting point of the core components, preferably at least 10° C. below the melting point of the core components.

The fibres forming the nonwoven fabric can be modified by the usual additives, for example by antistatic agents such as carbon black or additives which permit electrostatic charging. Furthermore additives for improving the flame resistance are possible.

The weight per unit area of the textile fabric formed in accordance with the steps a) to c) is between 50 and 400 g/m$^2$, preferably 100 and 350 g/m$^2$, particularly 150 and 300 g/m$^2$.

In so far as the multilayered filter medium according to the invention requires further solidification, this is carried out by needling, particularly hydrodynamically.

In a preferred embodiment the multilayered filter medium according to the invention is solidified exclusively with thermoplastic binders without needling and without the addition of chemical binders.

In a preferred embodiment of the invention, the portion of the textile fabric formed in step a) is 30 to 50% by weight of the textile fabric formed in accordance with the steps a) to c).

In a preferred embodiment of the invention the portion of the textile fabric formed in step b) is 20 to 30% by weight of the textile fabric formed in accordance with the steps a) to c).

In a preferred embodiment of the invention the portion of the textile fabric formed in step c) is 20 to 30% by weight of the textile fabric formed in accordance with the steps a) to c).

Particularly preferably, the portion of the textile fabric formed in step a) is 30 to 50% by weight, the portion of the textile fabric formed in step b) is 20 to 30% by weight and the portion of the textile fabric formed in step c) is 20 to 30% by weight with respect to the textile fabric formed in accordance with the steps a) to c).

In a preferred embodiment of the invention the portion of the melt binder fibres in the textile fabric formed in accordance with the steps a) to c) is 10 to 40% by weight.

In a preferred embodiment of the invention the previously described multicomponent and/or bicomponent fibres are wholly or partly used instead of the carrier and melt binder fibres. By using such multicomponent and/or bicomponent fibres the portion of melt binder can also be reduced such that said melt binder in the case of the textile fabric formed in accordance with the steps a) to c) is 10 to 30% by weight.

The pre-solidification of the multilayered textile fabric formed in accordance with the steps a) to c) and/or a) to c') takes place by means of one or more consecutively arranged, heated cylinders whose surface temperature is at least 70° C. Particularly preferably the pre-solidification takes place without additional contact pressure. The surface temperature is preferably at least 100° C. The surface temperature is preferably at least 10° C. below the melting temperature of the melt binder fibres, particularly at least 30° C. below the melting temperature of the melt binder fibres. Particularly preferably the pre-solidification takes place at a temperature and/or surface temperature of the rollers which is below the calendering temperature.

The calendering of the multilayered textile fabric pre-solidified in accordance with step g) preferably takes place by means of a calender whose surface temperature is at least 15°

C. below the melting temperature of the melt binder fibres, particularly at least 20° C. below the melting temperature of the melt binder fibres.

The calendering of the multilayered textile fabric pre-solidified in accordance with step g) preferably takes place by means of a calender and a contact pressure/line pressure of at least 20 daN, particularly of 40 to 60 daN.

The calendering of the multilayered textile fabric pre-solidified in accordance with step g) preferably takes place at the aforementioned contact pressure/line pressure and aforementioned surface temperature.

After the calendering in accordance with step h), the calendered multilayered textile fabric is introduced into a hot-air oven. The temperature of the hot air blown into the hot-air oven is at least at the melting temperature of the melt binder fibres (lower limit) and at least 10° C. below the melting temperature of the carrier fibres (upper limit). The hot-air ovens employed in accordance with the invention are known to the person skilled in the art. Said hot-air ovens may have one more drums. In so far as the hot-air ovens have several drums, for example three drums, the textile fabric is guided alternately around the lower and/or upper half of the drum. The hot air is generated centrally and sucked through the textile fabric and/or nonwoven fabric and the perforated drum into the interior of the drums. Such hot-air ovens are obtainable from the company Fleissner as so-called through-air dryers.

The textile fabric and/or nonwoven fabric is preferably guided at a speed of 10 m/min (±20%, particularly preferably ±10%) through the oven.

The dwell time of the textile fabric and/or nonwoven fabric in the oven is preferably 20 sec (±20%, particularly preferably ±10%).

By means of the special combination of special individual layers in accordance with the steps a) to c) and/or a) to c') and their composition in accordance with step d) in combination with the combination of pre-solidification in accordance with step g) and calendering in accordance with step h) a textile fabric, particularly a nonwoven fabric, is produced which can expand in the case of thermoplastic solidification in the hot-air oven. In this case the thickness increases by at least 30%, preferably by at least 35%, particularly by at least 40%, each with respect to the textile fabric and/or nonwoven fabric introduced into the hot-air oven.

Due to the expansion described above, the air permeability of the multilayered filter medium increases by more than 50%, preferably by more than 80%, each with respect to the textile fabric and/or nonwoven fabric introduced into the hot-air oven.

The air permeability of the multilayered filter medium manufactured in accordance with the invention is at least 500 $l/m^2sec$, measured according to ISO 9237.

The multilayered filter media manufactured by means of the method in accordance with the invention is distinguished by particularly good filtration characteristics, particularly in the case of SAE dusts of the class "fine" (ISO Fine).

Thus a multilayered filter medium manufactured using the method in accordance with the invention having a weight per unit area of 180 $g/m^2$, when charged with 5 $mg/cm^2$ SAE dust of the class "fine", exhibits a pressure increase of no more than 70 Pa. The measurement of the pressure increase and charging is carried out with a PALAS dust generator and measuring device MFP 2000 from the company PALAS.

A further subject-matter of the present invention is thus a multilayered filter medium, whose air permeability is at least 500 $l/m^2sec$ and which has at least three concrete layers, wherein I) the first layer is a melt binder-solidified textile fabric whose fibres have a titre in the range of 1 to 2 dtex,
II) the second layer is a melt binder-solidified textile fabric whose fibres have a titre in the range of 2 to 4 dtex,
III) the third layer is a melt binder-solidified textile fabric whose fibres have a titre in the range of 4 to 12 dtex,
IV) the portion of the first layer of the multilayered filter medium is 20 to 60% by weight, the portion of the second layer of the multilayered filter medium is 10 to 40% by weight and the portion of the third layer of the multilayered filter medium is 10 to 40% by weight,
V) the melt binder portion in the layers in accordance with I) to III) amounts to 5 to 40% by weight in total,
VI) the weight per unit area of the layers in accordance with I) to III) amounts to 50 to 400 $g/m^2$ in total and
VII) the filter medium, when charged with 5 $mg/cm^2$ SAE dust of the class "fine", has a pressure increase of no more than 100 Pa, preferably of no more than 70 Pa.

A further subject-matter of the present invention is thus a multilayered filter medium whose air permeability is at least 500 $l/m^2sec$ and which has at least three concrete layers, wherein I) the first layer is a melt binder-solidified textile fabric whose fibres have a titre in the range of 1 to 2 dtex,
II) the second layer is a melt binder-solidified textile fabric whose fibres have a titre in the range of 2 to 4 dtex,
III) the third layer is a melt binder-solidified textile fabric whose fibres have a titre in the range of 4 to 12 dtex,
IV) the fourth layer is a melt binder-solidified textile fabric whose fibres have different titres in the range of 1 to 12 dtex and a weight per unit area of 50-400 $g/m^2$, preferably a weight per unit area of 50-200 $g/m^2$,
V) the portion of the first layer of the multilayered filter medium in accordance with I) to III) is 20 to 60% by weight, the portion of the second layer of the multilayered filter medium in accordance with I) to III) is 10 to 40% by weight and the portion of the third layer of the multilayered filter medium in accordance with I) to III) is 10 to 40% by weight,
VI) the melt binder portion in the layers in accordance with I) to IV) amounts to 5 to 40% by weight in total,
VII) the weight per unit area of the layers in accordance with I) to III) amounts to 50 to 400 $g/m^2$ in total and
the filter medium, when charged with 5 $mg/cm^2$ SAE dust of the class "fine", exhibits a pressure increase of no more than 100 Pa, preferably of no more than 70 Pa.

The melt binder-solidified textile fabrics in accordance with I) to III) and/or I) to IV) can from be formed from the above-described carrier and melt binder fibres or by the above-described multicomponent and/or bicomponent fibres. The preferred embodiments specified in connection with the method also apply for the multilayered filter medium according to the invention.

The multilayered filter medium according to the invention may exhibit additional supporting nonwoven fabric layers and/or top layers. Such additional layers are known, for example, from DE102007027299.

The multilayered filter medium according to the invention can be additionally equipped with functional materials. For example coatings with conductive or antibacterial materials may also be executed. This makes it possible to adapt the characteristics profile of the filter medium to special requirements.

The filter media according to the invention are used in air/gas and fluid filtration, particularly in the automotive sector, in air conditioning systems, indoor area filters, pollen filters, clean-room filters, domestic filters and as oil filters and hydraulic filters.

Filter elements and filter bags as well as filter modules and/or cartridges containing the filters according to the invention are therefore also subject-matter of the present invention. In this case the filters may be installed in housings or other casings in pleated form. Corresponding embodiments are disclosed by U.S. Pat. No. 5,883,501.

A further area of application of the filters according to the invention is so-called LEF (Low Efficiency Filters) and HEPA (High Efficiency Particulate (Air) Filters) wherein the latter can also be used in water treatment. In accordance with EN 1822, the HEPA filters are also designated as filter classes H10 to H14.

A further area of application of the filters according to the invention are so-called HVAC and so-called ASHRAE filter media.

A further area of application of the filters according to the invention are so-called ULPA filters, i.e. for clean and ultra-clean rooms (ISO class 1000 and better). In accordance with EN 1822, ULPA filters are also designated as filter classes U15 to U17.

The following examples serve to explain the invention without limiting the invention.

Example 1

A filter medium has been manufactured with the aid of the spunbond method. In this case PET filament layers of 1.7 dtex, 3.4 dtex and 6.2 dtex each having two spin beams were produced and laid on the folding belt. The following process parameters were set in this case:

Weight per unit area: approx. 180 g/m²

Hot roller: 100° C.

Calender: 160° C., 24 daN/cm²

Oven: 235° C. (Fleissner rotary drum drier)

Line speed: 6.6 m/min

The testing of the filter medium according to the invention (047/180) shows in comparison (FIG. 1) with a conventionally manufactured filter medium (478/170) having a comparable weight per unit area that the multilayered filter medium manufactured using the method in accordance with the invention, when charged with 5 mg/cm² SAE dust of the class "fine", exhibits a pressure increase of no more than 70 Pa whereas a conventionally manufactured filter medium exhibits the significantly higher pressure increase of 1800 Pa.

The filter charge was determined and the consequential pressure increase was measured with the help of the PALAS MFP 2000 dust generator. The measurement was carried out on a 100 cm² sample at a flow speed of 20 cm/sec at a dust concentration in the air of 200 mg/m³.

Example 2

In order to determine the air permeability a filter element was manufactured in accordance with example 1, however with a weight per unit area of approx. 250 g/m². In this case the thickness of the nonwoven fabric and the air permeability were measured before (Sample X01) and after (Sample X02) calendering. The results are shown in Table 1.

TABLE 1

| Sample | Weight g/m² | Thickness mm | Increase in thickness % | Air l/m²s | Air increase % |
|---|---|---|---|---|---|
| V09027[01] | 247 | 1.10 | | 317 | |
| V09027[02] | 252 | 1.56 | 42 | 705 | 122 |

The invention claimed is:

1. A method for the manufacture of a multilayered filter medium whose air permeability is at least 500 l/m² sec comprising the measures:
    a) Forming a textile fabric comprising carrier and melt binder fibres wherein the carrier fibres consist of a polyester and the melt binder fibres consist of a polymer whose melting point is at least 5° C. below the melting point of the carrier fibres and the carrier and melt binder fibres have a titre between 1 to 2 dtex,
    b) Forming a further textile fabric on a textile surface formed in step a) comprising carrier and melt binder fibres wherein the carrier fibres consist of a polyester and the melt binder fibres consist of a polymer whose melting point is at least 5° C. below the melting point of the carrier fibres and the carrier and melt binder fibres have a titre between 2 to 4 dtex,
    c) Forming a further textile fabric on a textile surface formed in step b) comprising carrier and melt binder fibres wherein the carrier fibres consist of a polyester and the melt binder fibres consist of a polymer whose melting point is at least 5° C. below the melting point of the carrier fibres and the carrier and melt binder fibres have a titre between 4 to 12 dtex, wherein:
    d) The portion of the textile fabric formed in step a) is 20 to 60% by weight, the portion of the textile fabric formed in step b) is 10 to 40% by weight and the portion of the textile fabric formed in step c) is 10 to 40% by weight,
    e) The portion of the melt binder fibres in textile fabric formed in accordance with steps a) to c) is 5 to 40% by weight, and
    f) The weight per unit area of the textile fabric formed in accordance with steps a) to c) is 50 to 400 g/m²,
    g) Pre-solidifying the multilayered textile fabric formed in accordance with steps a) to c) by means of a heated roller whose surface temperature is at least 70° C.,
    h) Calendering the pre-solidified multilayered textile fabric formed in accordance with step g) by means of a calender whose surface temperature is at least 10° C. below the melting temperature of the melt binder fibres and a contact pressure or line pressure of least 20 daN,
    i) Introducing the multilayered textile fabric calendered in accordance with step h) into a hot-air oven whose minimum temperature is equal to or above the melting temperature of the melt binder fibres and whose maximum temperature is at least 10° C. below the melting temperature of the carrier fibres wherein the introduced textile fabric expands and the thickness of the textile fabric increases by at least 30% with respect to the introduced textile fabric, and
    j) Cooling a melt binder-solidified multilayered filter medium formed in step i).

2. The method according to claim 1, characterized in that further textile fabrics are formed after step f) and before step g).

3. The method according to claim 1, characterized in that the textile fabrics formed according to steps a) to c), and any possible formed further textile fabrics concern nonwoven fabrics, preferably staple fibre nonwoven fabrics and/or spunbonded nonwoven fabrics.

4. The method according to claim 1, characterized in that the carrier and melt binder fibres are co-extruded.

5. The method according to claim 1, characterized in that the carrier and melt binder fibres comprise bicomponent fibres of the core-sheath type whose core is formed from polyester and whose sheath is formed from a polymer whose melting point is at least 5° C. below the melting point of the core component, preferably at least 10° C. below the melting point of the core component.

6. The method according to claim 1, characterized in that the weight per unit area of the textile fabric formed in accordance with the steps a) to c) is 50 to 350 g/m², preferably 50 to 300 g/m².

7. The method according to claim 1, characterized in that the pre-solidification of the multilayered textile fabric formed in accordance with the steps a) to c) takes place by means of a heated roller whose surface temperature is at least 70° C., preferably without additional contact pressure, preferably at a surface temperature of at least 100° C.

8. The method according to claim 1, characterized in that the pre-solidification, of the multilayered textile fabric formed in accordance with the steps a) to c) takes place at a maximum surface temperature of at least 10° C. below the melting temperature of the melt binder fibres, particularly at least 30° C. below the melting temperature of the melt binder fibres.

9. The method according to claim 1, characterized in that the calendering of the multilayered textile fabric pre-solidified in accordance with step g) takes place by means of calenders whose surface temperature is at least 15° C. below the melting temperature of the melt binder fibres and/or melt binder components, preferably at least 20° C. below the melting temperature of the melt binder fibres and/or melt binder component.

10. The method according to claim 1, characterized in that the calendering of the multilayered textile fabric pre-solidified in accordance with step g) takes place by means of calenders and a contact pressure or line pressure of at least 20 daN, preferably of 40 to 60 daN.

11. The method according to claim 1, characterized in that after the calendering in accordance with step h) the calendered multilayered textile fabric is introduced into a hot-air oven.

12. The method according to claim 11, characterized in that the temperature of the hot air blown into the hot-air oven is the same as or above the melting temperature of the melt binder fibres and/or melt binder component and at least 10° C. below the melting temperature of the carrier fibres and/or core component.

13. The method according to claim 11, characterized in that the hot air is sucked through the textile fabric and/or nonwoven fabric and the perforated drum in the interior of the hot-air oven.

14. The method according to claim 11, characterized in that the textile fabric and/or nonwoven fabric is guided through the hot-air oven at a speed of 10 m/sec (±20%).

15. The method according to claim 11, characterized in that the dwell time of the textile fabric and/or nonwoven fabric in the hot-air oven is 20 secs (±20%).

16. The method according to claim 1, characterized in that the thickness of the textile fabric increases during the thermoplastic solidification in the hot-air oven by at least 0.35%, preferably by at least 40%, each with respect to the textile fabric introduced into the hot-air oven.

17. The method according to claim 1, characterized in that the fibres of the textile fabric and/or nonwoven fabric formed have no texturing.

* * * * *